(12) United States Patent
Delpapa et al.

(10) Patent No.: US 9,847,662 B2
(45) Date of Patent: Dec. 19, 2017

(54) VOLTAGE SLEW RATE THROTTLING FOR REDUCTION OF ANOMALOUS CHARGING CURRENT

(71) Applicant: SanDisk Enterprise IP LLC, Milpitas, CA (US)

(72) Inventors: Kenneth B. Delpapa, Natick, MA (US); Charles N. Gibson, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 93 days.

(21) Appl. No.: 14/630,564

(22) Filed: Feb. 24, 2015

(65) Prior Publication Data

US 2016/0118814 A1    Apr. 28, 2016

Related U.S. Application Data

(60) Provisional application No. 62/069,186, filed on Oct. 27, 2014.

(51) Int. Cl.
  *H02J 7/00*    (2006.01)
  *H02J 7/34*    (2006.01)

(52) U.S. Cl.
  CPC ............... *H02J 7/007* (2013.01); *H02J 7/345* (2013.01)

(58) Field of Classification Search
  CPC ..................................................... H02J 7/007
  See application file for complete search history.

(56) References Cited

U.S. PATENT DOCUMENTS 5,493,196 A * 2/1996 Feldstein ............. H02J 7/0018
                                                    320/100
5,714,869 A * 2/1998 Tamechika ........... H02J 7/0031
                                                    320/101

(Continued)

FOREIGN PATENT DOCUMENTS

| EP | 0 878 755 A1 | 11/1998 |
| EP | 2 602 707 A2 | 6/2013 |
| WO | WO 2010/116349 | 10/2010 |

OTHER PUBLICATIONS

Internation Search Report and Written Opinion dated Jul. 14, 2015, received in International Patent Application No. PCT/US2015/027265, which corresponds to U.S. Appl. No. 14/572,619, 10 pages (Ellis).

(Continued)

*Primary Examiner* — Samuel Berhanu
(74) *Attorney, Agent, or Firm* — Morgan, Lewis & Bockius LLP

(57) ABSTRACT

Systems, methods and/or devices are used to reduce anomalous charging current by selectively shunting biasing current away from a control terminal of a controlled device that conducts the charging current during a charging mode. In some embodiments, a power-control circuit includes: (1) a controlled device with a first terminal coupled to a power-supply node, a second terminal to provide a first output voltage, and a control terminal; (2) a current source to provide a biasing current to the control terminal of the controlled device during a charging mode; and (3) a selective current shunt to shunt a portion of the biasing current away from the control terminal of the controlled device in response to a determination that a charging current through the first and second terminals of the controlled device satisfies a threshold during the charging mode.

23 Claims, 7 Drawing Sheets

(56) References Cited

U.S. PATENT DOCUMENTS

| | | | |
|---|---|---|---|
| 6,035,347 A * | 3/2000 | Beardsley | G06F 11/1441 710/17 |
| 6,172,573 B1 * | 1/2001 | Lim | H03K 3/012 331/111 |
| 8,725,931 B1 | 5/2014 | Kang | |
| 8,751,836 B1 | 6/2014 | Piszczek et al. | |
| 8,788,779 B1 | 7/2014 | Horn | |
| 2001/0011319 A1 | 8/2001 | Beppu | |
| 2004/0021444 A1 * | 2/2004 | Peschke | H02M 3/157 320/128 |
| 2004/0130299 A1 * | 7/2004 | Pietkiewicz | H02M 3/335 320/166 |
| 2004/0267409 A1 | 12/2004 | De Lorenzo et al. | |
| 2005/0108491 A1 | 5/2005 | Wong et al. | |
| 2005/0204175 A1 | 9/2005 | Burton | |
| 2005/0210304 A1 | 9/2005 | Hartung et al. | |
| 2008/0098242 A1 | 4/2008 | Peterson | |
| 2009/0171513 A1 | 7/2009 | Tsukazawa | |
| 2010/0049905 A1 | 2/2010 | Ouchi | |
| 2011/0122691 A1 | 5/2011 | Sprouse | |
| 2011/0191666 A1 | 8/2011 | Decker et al. | |
| 2011/0239009 A1 | 9/2011 | Noda | |
| 2011/0314312 A1 | 12/2011 | Naffziger et al. | |
| 2012/0023346 A1 | 1/2012 | Byom et al. | |
| 2012/0159057 A1 | 6/2012 | Loh et al. | |
| 2012/0290864 A1 | 11/2012 | Seroff | |
| 2012/0331207 A1 | 12/2012 | Lassa et al. | |
| 2012/0331282 A1 | 12/2012 | Yurzola et al. | |
| 2013/0080679 A1 | 3/2013 | Bert | |
| 2013/0275781 A1 | 10/2013 | Ramage et al. | |
| 2013/0305008 A1 | 11/2013 | Kwon et al. | |
| 2014/0304560 A1 | 10/2014 | Narasimha et al. | |
| 2015/0033045 A1 | 1/2015 | Raghuvanshi et al. | |
| 2015/0323976 A1 | 11/2015 | Chen et al. | |
| 2016/0062421 A1 | 3/2016 | Sugawara et al. | |

OTHER PUBLICATIONS

International Search Report and Written Opinion dated Dec. 15, 2015, received in International Patent Application No. PCT/US2015/053641, which corresponds to U.S. Appl. No. 14/668,710, 12 pages (Thangaraj).

International Search Report and Written Opinion dated Dec. 14, 2015, received in International Patent Application No. PCT/US2015/053644, which corresponds to U.S. Appl. No. 14/668,722, 12 pages (Thangaraj).

International Search Report and Written Opinion dated Feb. 11, 2016, received in International Patent Application No. PCT/US2015/053549 which corresponds to U.S. Appl. No. 14/572,633, 13 pages (Ellis).

International Preliminary Report on Patentability dated Apr. 25, 2017, received in International Patent Application No. PCT/US2015/053549 which corresponds to U.S. Appl. No. 14/572,633, 8 pages (Ellis).

International Preliminary Report on Patentability dated May 2, 2017, received in International Patent Application No. PCT/US2015/053641, which corresponds to U.S. Appl. No. 14/668,710, 7 pages (Thangaraj).

International Preliminary Report on Patentability dated May 2, 2017, received in International Patent Application No. PCT/US2015/053644, which corresponds to U.S. Appl. No. 14/668,722, 7 pages (Thangaraj).

* cited by examiner

VOLTAGE SLEW RATE THROTTLING FOR REDUCTION OF ANOMALOUS CHARGING CURRENT

RELATED APPLICATION

This application claims priority to U.S. Provisional Patent Application No. 62/069,186, filed Oct. 27, 2014, which is hereby incorporated by reference in its entirety.

TECHNICAL FIELD

The disclosed embodiments relate generally to power-control circuitry, and in particular, to power-control circuitry for charging energy-storage devices (e.g., capacitors) in electronic systems.

BACKGROUND

Charged capacitors are used to briefly supply power to circuitry in the event of a loss of power. The energy stored in the capacitors may allow the circuitry to continue to function momentarily and thus to complete at least some operations that were scheduled or in process when power was lost. The capacitors are charged up when the system powers on. Some capacitors (e.g., some polymer electrolyte devices) may draw an unexpectedly large amount of current, referred to as anomalous charging current, when being charged. Anomalous charging current may result in violation of a system's charging-current specification, tripping of upstream circuit protection, overloading and shutdown of upstream power supplies, and drooping of supply voltage.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to reduce anomalous charging current when charging an energy-storage device such as a capacitor or bank of capacitors. In some embodiments, biasing current is provided to a control terminal of a controlled device (e.g., a transistor) that conducts a charging current during a charging mode. A portion of the biasing current is shunted away from the control terminal in response to a determination that the charging current is too high and thus anomalous. Shunting a portion of the biasing current away from the control terminal reduces the rate of increase of the voltage on the control terminal, which reduces (i.e., throttles) the slew rate of the output voltage of the controlled device, effecting a reduction in the charging current. Limiting the shunting to situations in which the charging current is anomalous ensures that the charging current is not unduly limited when it is not anomalous, allowing for rapid charging of an energy-storage device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
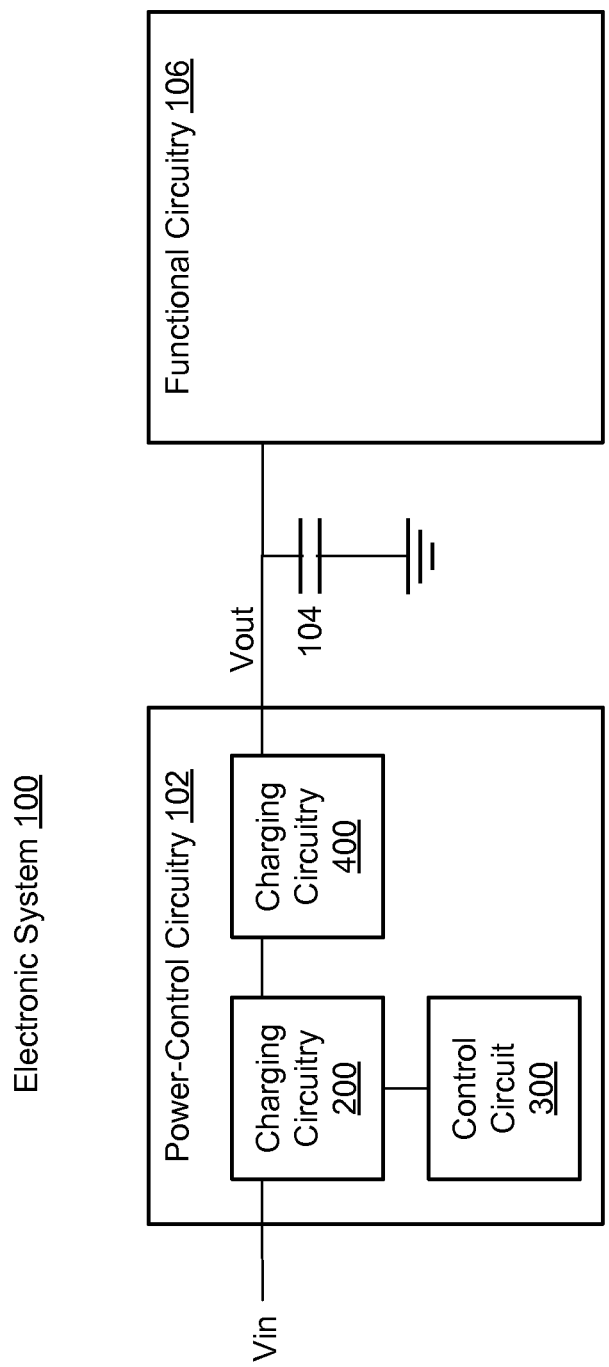
FIG. 1 is a block diagram illustrating an electronic system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

When an energy-storage device such as a bank of capacitors (e.g., polymer electrolyte capacitors) is being charged, the energy-storage device may draw an unexpectedly large amount of current. This anomalous charging current results, for example, from an undetected defect in the energy-storage device. Anomalous charging current may result in violation of a system's charging-current specification, tripping of upstream circuit protection, overloading and shutdown of upstream power supplies, and drooping of supply voltage. Consequently what is desired are mechanisms for selectively reducing charging current when it is determined to be anomalous. Such mechanisms should be selective because reduction of charging current that is not anomalous is undesirable: reducing charging current delays charging of the energy-storage device.

The various embodiments described herein include systems, methods, and/or devices used to reduce charging current. Some embodiments include systems, methods and/or devices to selectively shunt away a portion of a biasing current provided to a control terminal of a controlled device (e.g., a transistor) that conducts the charging current, thus reducing the rate of increase of the voltage on the control terminal, the slew rate of the output voltage of the controlled device, and the charging current.

(A1) More specifically, some embodiments include a power-control circuit that includes: (1) a controlled device with a first terminal coupled to a power-supply node, a second terminal to provide a first output voltage, and a control terminal; (2) a current source to provide a biasing current to the control terminal of the controlled device during a charging mode; and (3) a selective current shunt to shunt a portion of the biasing current away from the control terminal of the controlled device in response to a determination that a charging current through the first and second terminals of the controlled device satisfies a first threshold during the charging mode.

(A2) In some embodiments of the power-control circuit of A1, the power-control circuit also includes a control circuit to determine whether the charging current satisfies the first threshold and to assert a control signal in response to the determination that the charging current satisfies the first threshold. The selective current shunt is to shunt a portion of the biasing current away from the control terminal of the controlled device in response to assertion of the control signal.

(A3) In some embodiments of the power-control circuit of A2, the selective current shunt includes one or more resistors and a transistor situated in series with the one or more resistors between the control terminal of the controlled device and ground. The transistor, which includes a control terminal to receive the control signal, is configured to couple the control terminal of the controlled device to ground through the one or more resistors in response to assertion of the control signal.

(A4) In some embodiments of the power-control circuit of A2 or A3, the control circuit is to de-assert the asserted control signal in response to a determination during the charging mode that the charging current does not satisfy the first threshold.

(A5) In some embodiments of the power-control circuit of A2, A3, or A4, the control circuit includes a microcontroller and the first threshold is programmable.

(A6) In some embodiments of the power-control circuit of A2 or A3, the control circuit is to de-assert the asserted control signal in response to a determination during the charging mode that the charging current does not satisfy a second threshold that is lower than the first threshold.

(A7) In some embodiments of the power-control circuit of A6, the control circuit includes a microcontroller and the first and second thresholds are programmable.

(A8) In some embodiments of the power-control circuit of any of A2-A7, the power-control circuit also includes current-sensing circuitry to monitor the charging current and provide a current-monitoring signal that indicates a value of the charging current to the control circuit.

(A9) In some embodiments of the power-control circuit of any of A1-A8, the power-control circuit further includes a diode with an input coupled to the second terminal of the controlled device and an output to provide a second output voltage to an energy-storage device.

(A10) In some embodiments of the power-control circuit of A9, the energy-storage device includes a capacitor bank.

(A11) In some embodiments of the power-control circuit of A10, the capacitor bank is a capacitor bank of a solid-state drive.

(A12) In some embodiments of the power-control circuit of any of A1-A11, the current source includes a constant-current source and the biasing current is a substantially constant current.

(A13) In some embodiments of the power-control circuit of A12, the constant-current source includes: (1) a driver, coupled to the control terminal of the controlled device, to provide a bias voltage; (2) a capacitor coupled to the control terminal of the controlled device; and (3) a transistor, coupled between the capacitor and ground, to selectively couple the capacitor to ground in accordance with a voltage-ramp signal.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating an electronic system 100 in accordance with some embodiments. The electronic system 100 includes power-control circuitry 102, an energy-storage device 104 (e.g., a capacitor or bank of capacitors), and functional circuitry 106. The power-control circuitry 102 receives an input voltage Vin from a power supply (not shown) and provides an output voltage Vout to the functional circuitry 106. During a charging mode, when the electronic system 100 is powering on, Vout is used to charge the energy-storage device 104. While charging the energy-storage device 104, Vout ramps up from zero to a predefined voltage level. Assuming the energy-storage device 104 is an ideal capacitor, it will draw current equal to the product of its capacitance and the time-rate-of-change of Vout (i.e., I=C*dV/dt). However, if the behavior of the energy-storage device 104 is non-ideal, it may draw additional current. If sufficiently high, the additional current is considered anomalous.

Once the energy-storage device 104 is fully charged, it may briefly provide power to the functional circuitry 106 in the event that power is lost. In some embodiments, the electronic system 100 is a solid-state drive and the energy-storage device 104 allows memory access operations that are in process and/or scheduled when power is lost to be completed.

Figure 2A:
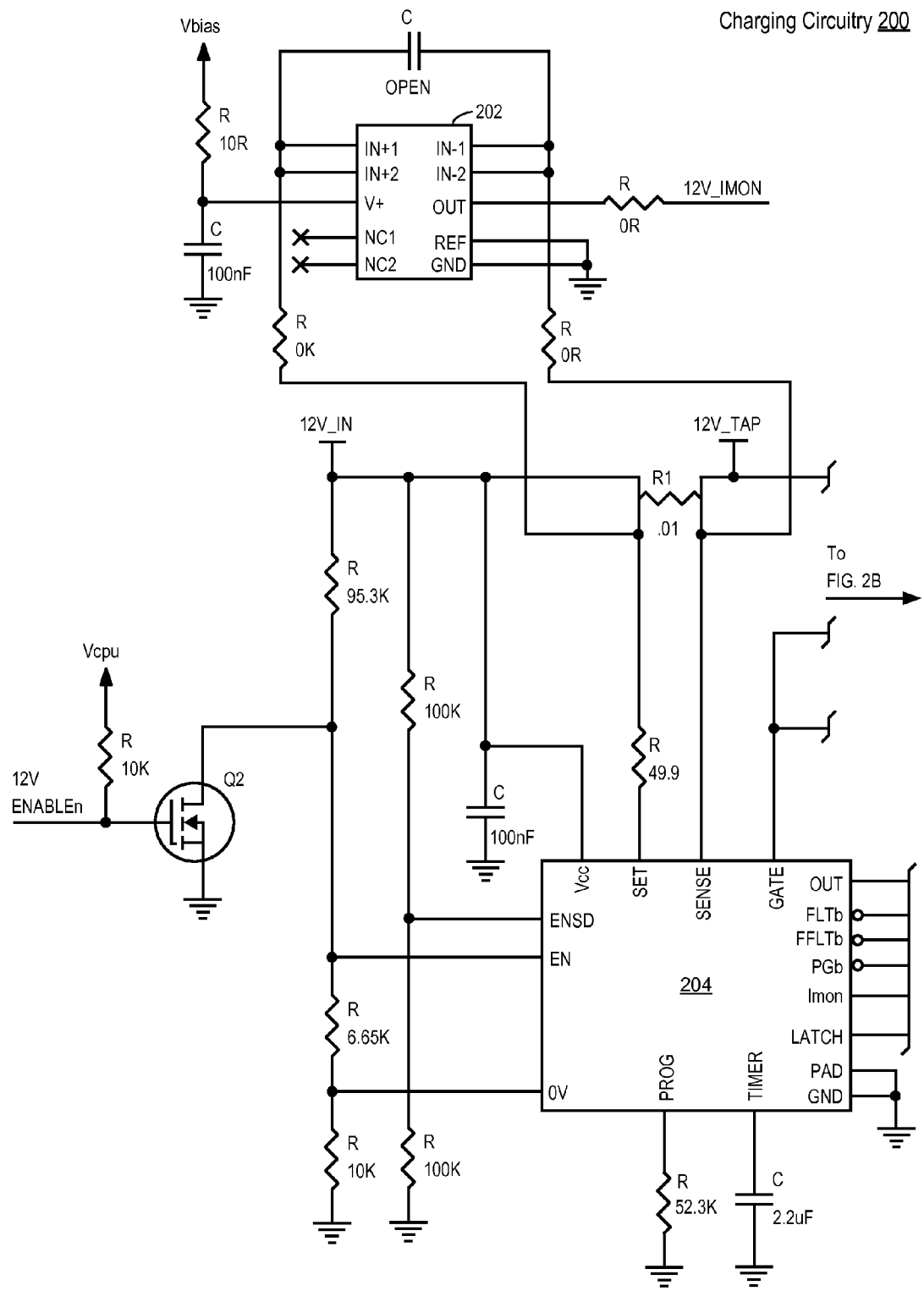
FIGS. 2A, 2B, 3, and 4 are circuit diagrams showing portions of power-control circuitry in accordance with some embodiments.
Figure 2B:
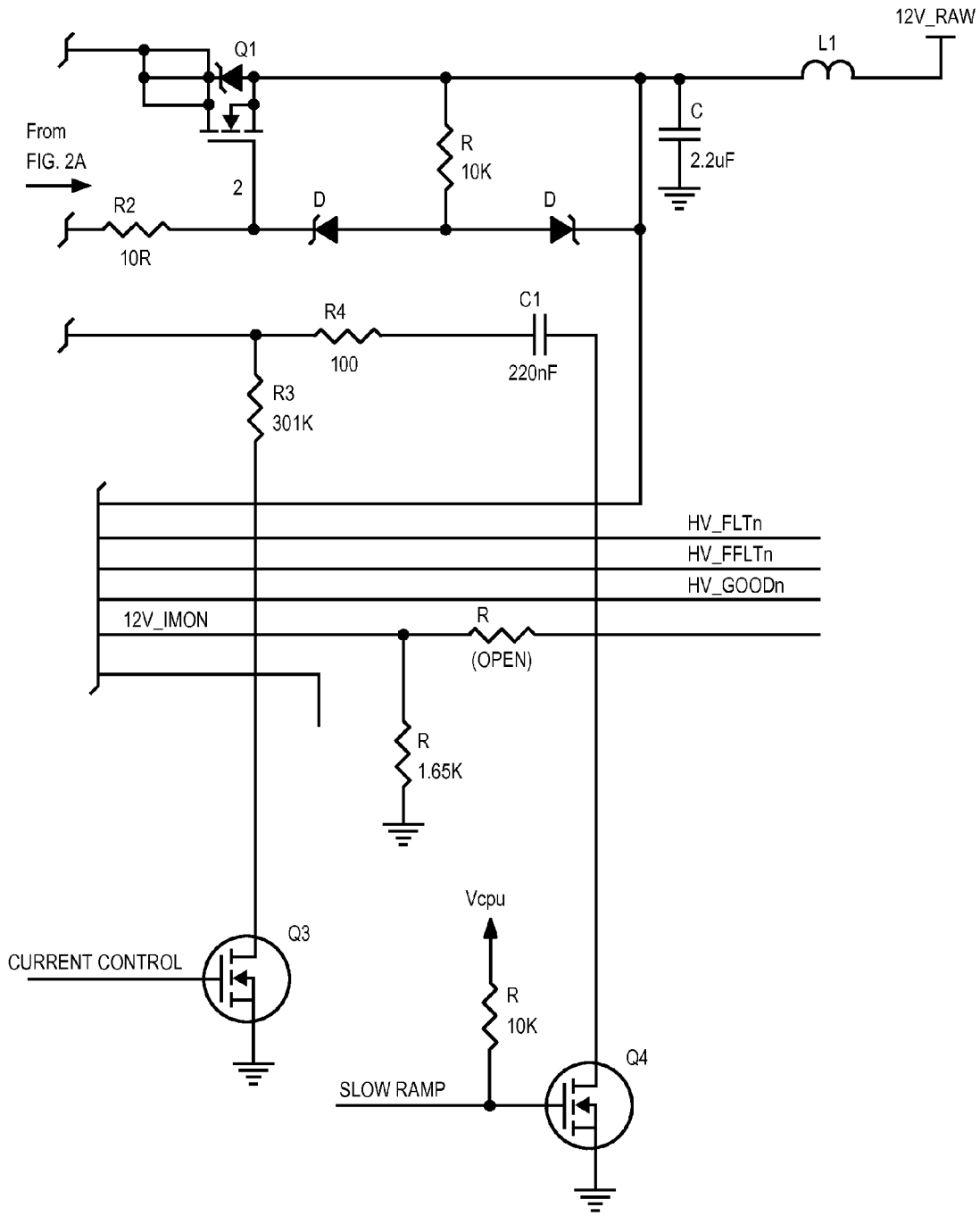
Figure 3:
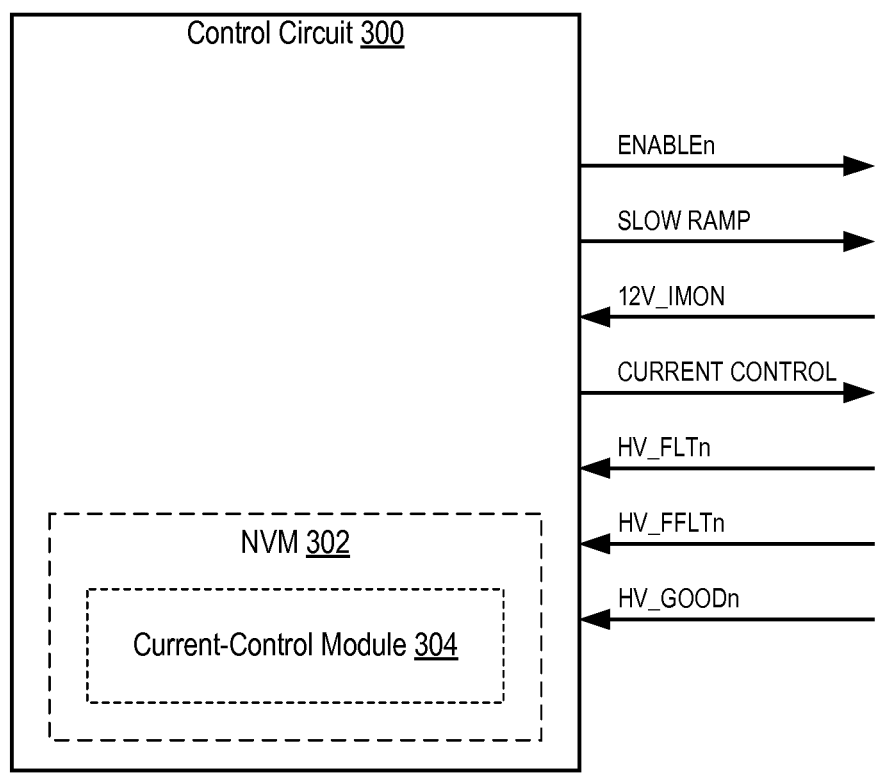
Figure 4:
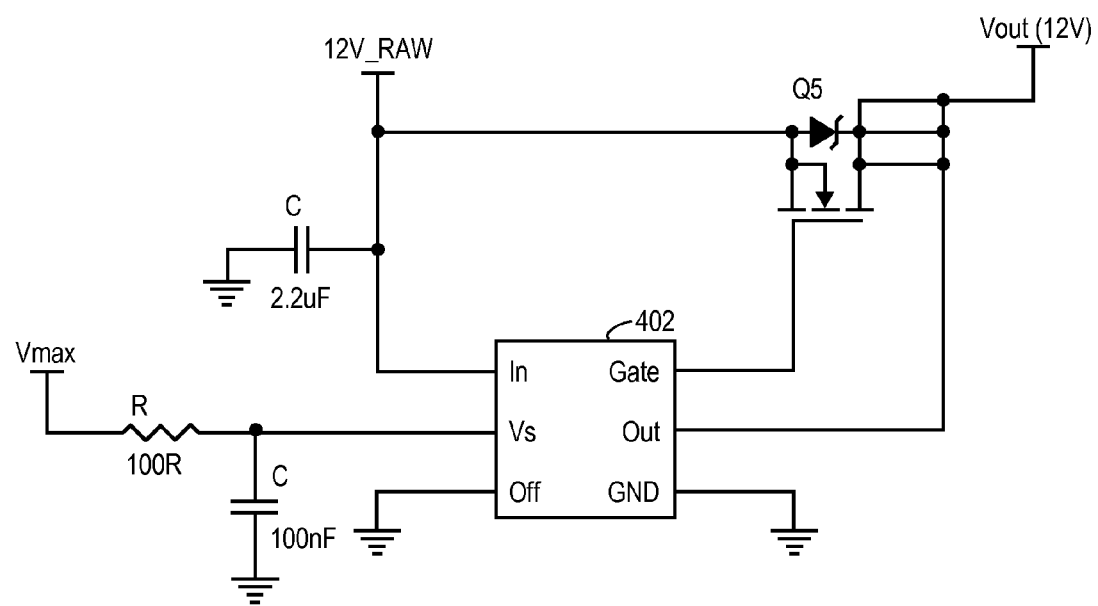

In some embodiments, the power-control circuitry 102 includes charging circuitry 200 as described below with respect to FIGS. 2A and 2B, a control circuit 300 as described below with respect to FIG. 3, and charging circuitry 400 as described below with respect to FIG. 4. The charging circuitry 200 receives Vin and provides an intermediate output voltage to the charging circuitry 400, which provides Vout. The charging circuitry 200 is coupled to and controlled by the control circuit 300. FIGS. 2A, 2B, 3, and 4 are thus circuit diagrams showing portions of circuitry in the power-control circuitry 102 in accordance with some embodiments. In these figures, resistors are labeled 'R', capacitors 'C', transistors 'Q,' diodes 'D,' and inductors 'L'; an index number is also shown for those elements described in the text. The values of respective circuit elements shown in the figures are merely examples.

FIGS. 2A and 2B show charging circuitry 200 in accordance with some embodiments. A power-supply node "12V_IN" (FIG. 2A) connects to a power supply. (The 12V level for the power-supply node 12V_IN is merely an example; the voltage level for this power-supply node may be different for different embodiments.) A transistor Q1 (FIG. 2B) has a first terminal coupled to the 12V_IN power-supply node, a second terminal that provides an output voltage, and a control terminal. In some embodiments, the transistor Q1 is a field-effect transistor (FET) (e.g., a power metal-oxide-semiconductor field-effect transistor (MOSFET), such as an IRFHM8363TRPBF MOSFET made by International Rectifier), such that the first and second terminals are respective source/drain terminals and the control terminal is a gate. The transistor Q1 is an example of a controlled device (as are all other transistors described herein): a signal applied to the control terminal controls the current flowing through first and second terminals.

The control terminal of the transistor Q1 is coupled through a resistor R2 to a GATE pin of a hot-swap controller 204 (e.g., a TPS24720 hot-swap controller made by Texas Instruments). The GATE pin drives the Q1 terminal (e.g., the gate). The hot-swap controller 204 thus includes a gate driver to drive the Q1 control terminal, in accordance with some embodiments. The gate driver may be enabled by the signal supplied to the EN pin of the hot-swap controller 204, which pin is controlled through application of an ENABLEn signal to a transistor Q2 (e.g., an n-channel enhancement-mode FET, such as a BSS138 W FET made by Fairchild). The Q1 control terminal is also coupled through resistors R2 and R4 to a first terminal of a capacitor C1. A second terminal of the capacitor C1 is coupled to a transistor Q4 (e.g., an n-channel enhancement-mode FET, such as a BSS138 W FET). The transistor Q4 selectively couples the second terminal of the capacitor C1 to ground, in accordance with a SLOW RAMP signal applied to the Q4 control terminal (e.g., gate).

In some embodiments, during a charging mode, the control terminal of the transistor Q1 is biased such that the output voltage at the second terminal increases at a substantially constant slew rate. To bias the transistor Q1 in this manner, a substantially constant current (e.g., constant to within the capability of a constant-current source) is applied to the Q1 control terminal. The current applied to the Q1 control terminal is referred to as biasing current. The GATE pin of the hot-swap controller 204, capacitor C1, and transistor Q4 (as operating in accordance with the SLOW RAMP signal) collectively act as the constant-current source that supplies the substantially constant biasing current to the Q1 control terminal.

The Q1 control terminal is further coupled through resistors R2 and R3 to a transistor Q3 (e.g., an n-channel enhancement-mode FET, such as a BSS138 W FET). The transistor Q3 is situated in series with the resistors R2 and R3 between the Q1 control terminal and ground. A CURRENT CONTROL signal is applied to the Q3 control terminal (e.g., gate). The transistor Q3 turns on when CURRENT CONTROL is asserted and turns off when CURRENT CONTROL is de-asserted. Accordingly, the transistor Q3 creates a current path from the Q1 control terminal to ground through resistors R2 and R3 when CURRENT CONTROL is asserted but not when CURRENT CONTROL is de-asserted. The transistor Q3 thus selectively couples the Q1 control terminal to ground through resistors R2 and R3, in accordance with CURRENT CONTROL.

Accordingly, the transistor Q3 and resistor R3 compose a selective current shunt that selectively shunts a portion of the biasing current away from the Q1 control terminal. More generally, the selective current shunt may include a controlled device in series with one or more resistors.

CURRENT CONTROL is initially de-asserted during the charging mode, such that transistor Q3 is initially off during the charging mode. If anomalous charging current through the first and second terminals of the transistor Q1 is detected, however, then CURRENT CONTROL is asserted, causing a portion of the biasing current to be shunted away from the Q1 control terminal through resistors R2 and R3 and transistor Q3 to ground. The biasing current being supplied to the Q1 control terminal is thereby reduced, which reduces the charging current (and thus, for example, the charging voltage slew rate). Examples of the assertion and de-assertion of CURRENT CONTROL are provided below in the methods 500 (FIG. 5A) and 550 (FIG. 5B).

In some embodiments, the charging current flowing through the first and second terminals of the transistor Q1 is monitored using a current-shunt resistor R1 (FIG. 2A), which is in series with the transistor Q1 and therefore also conducts the charging current. The current through the current-shunt resistor R1 may be monitored using a current-shunt monitor 202 (e.g., an INA199B1 current-shunt monitor made by Texas Instruments), which generates a current-monitoring signal 12V_IMON. The value (e.g., voltage) of the current-monitoring signal corresponds to the measured value of the charging current (e.g., in accordance with a specified ratio of volts to amps, such as 0.5 V/A). Alternatively, the current through the current-shunt resistor R1 may be monitored using the hot-swap controller 204, which then generates 12V_IMON. (In the example of FIGS. 2A-2B, 12V_IMON is provided by the current-shunt monitor 202. The hot-swap controller 204 does not provide 12V_IMON in this example, as indicated by the fact that the resistor connected to the Imon pin of the hot-swap controller 204 is open/absent.)

The combination of the current-shunt resistor R1 and current-shunt monitor 202 is thus an example of current-sensing circuitry, as is the combination of the current-shunt resistor R1 and current-monitoring circuitry in the hot-swap controller 204. In still other examples, other current-sensing techniques may be used. For example, a Hall-effect sensor or sense FET may be used for current sensing.

The current-monitoring signal 12V_IMON is provided to a control circuit 300, which is shown in FIG. 3 in accordance with some embodiments. In some embodiments, the control circuit 300 is a processor (e.g., a microcontroller, such as an SiM3C167 microcontroller made by Silicon Labs). The control circuit 300 generates the CURRENT CONTROL signal and determines whether to assert or de-assert CURRENT CONTROL based on whether the charging current, as indicated by 12V_IMON, satisfies a threshold (e.g., in accordance with the method 500 or 550, FIGS. 5A-5B). The control circuit 300 may make this determination periodically (e.g., with a 100 us periodicity) during the charging mode.

The control circuit 300 also generates the SLOW RAMP and ENABLEn signals, and receives signals HV_GOODn, HV_FLTn, and HV_FFLTn that are generated by the hot-swap controller 204. In some embodiments, HV_GOODn is asserted when the voltage across the first and second terminals of the transistor Q1 falls below a threshold for a specified period of time. The control circuit 300 may use HV_GOODn to determine when to exit the charging mode. For example, control circuit 300 ends the charging mode when HV_GOODn is asserted and an output voltage of the power-control circuitry has reached a specified level. HV_FLTn and HV_FFLTn may indicate that respective faults have occurred.

In some embodiments (e.g., in which the control circuit 300 is a processor), the control circuit 300 includes a non-volatile memory (NVM) 302 (e.g., flash memory) that serves as a non-transitory computer-readable storage medium. The non-volatile memory 302 stores a current-control module 304 that corresponds to a set instructions, configured for execution by the control circuit 300, for performing power-control functions as described above, in the method 500 (FIG. 5A), and/or in the method 550 (FIG. 5B). Alternatively, or in addition, instructions for performing power-control functions are stored in a non-transitory computer-readable storage medium that is external to the control circuit 300.

In some embodiments, the second terminal of the transistor Q1 is coupled to an energy storage device 104 (e.g., a capacitor or bank of capacitors) through an inductor L1 (FIG. 2B) (e.g., an FB-series M-type chip-bead inductor such as the FBMJ3216HS800-T made by Taiyo Yuden) and a transistor Q5 (FIG. 4) (e.g., a power metal-oxide-semiconductor field-effect transistor (MOSFET), such as an IRFHM8363TRPBF MOSFET made by International Rectifier). The transistor Q5 is part of the charging circuitry 400, as shown in FIG. 4 in accordance with some embodiments. The transistor Q5 is configured to be a diode. The inductor L1 receives the output voltage of the second terminal of the transistor Q1 and provides a voltage "12V_RAW" to a first terminal of the transistor Q5. 12V_RAW is thus an example of the intermediate output voltage provided by the charging circuitry 200 to the charging circuitry 400. The transistor Q5 operates under the control of a FET controller 402 (e.g., an LM5050-1 FET controller made by Texas Instruments), which ensures that there is a constant voltage drop across the transistor Q5, in accordance with its diode function. The Gate pin of the FET controller 402 drives the control terminal (e.g., gate) of the transistor Q5. The transistor Q5 provides from its second terminal a "12V" output voltage that may be used to charge an energy storage device 104 (FIG. 1) (e.g., a capacitor or bank of capacitors). The 12V output voltage is an example of Vout (FIG. 1), in accordance with some embodiments. (Again, the 12V value is merely an example; similar circuitry may be used to create an output voltage of another level.)

The examples given with respect to the transistors Q1 through Q5 indicate that these transistors may be FETs. However, it should be apparent that power-control circuitry that performs selective current shunting to mitigate anomalous charging current may use other types of controlled devices. For example, bipolar junction transistors (BJTs) may be used. For a BJT, the control terminal is the base.

Attention is now directed to methods of mitigating anomalous charging current.

Figure 5A:
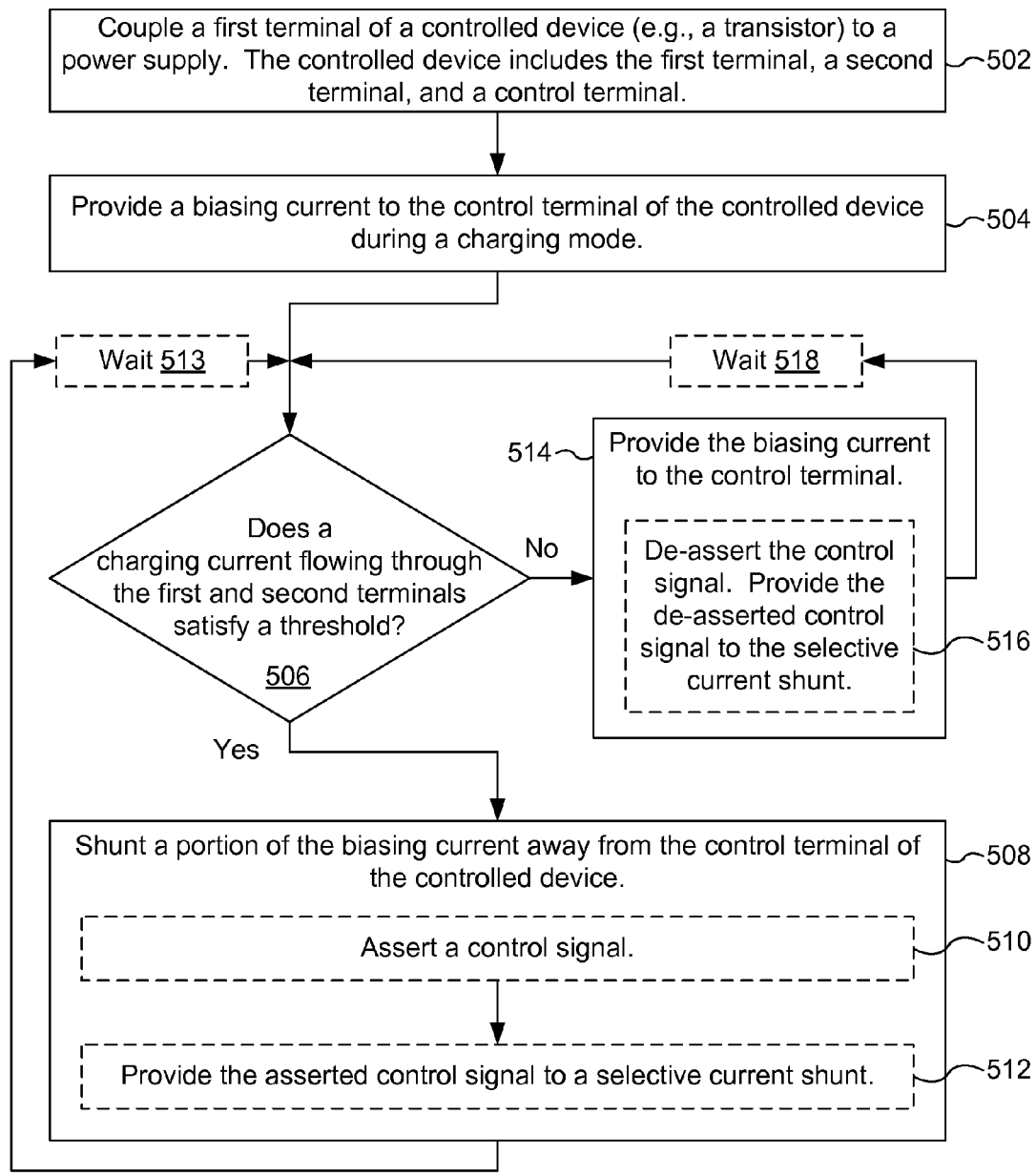
FIGS. 5A and 5B illustrate flowchart representations of methods of mitigating anomalous charging current, in accordance with some embodiments.
Figure 5B:
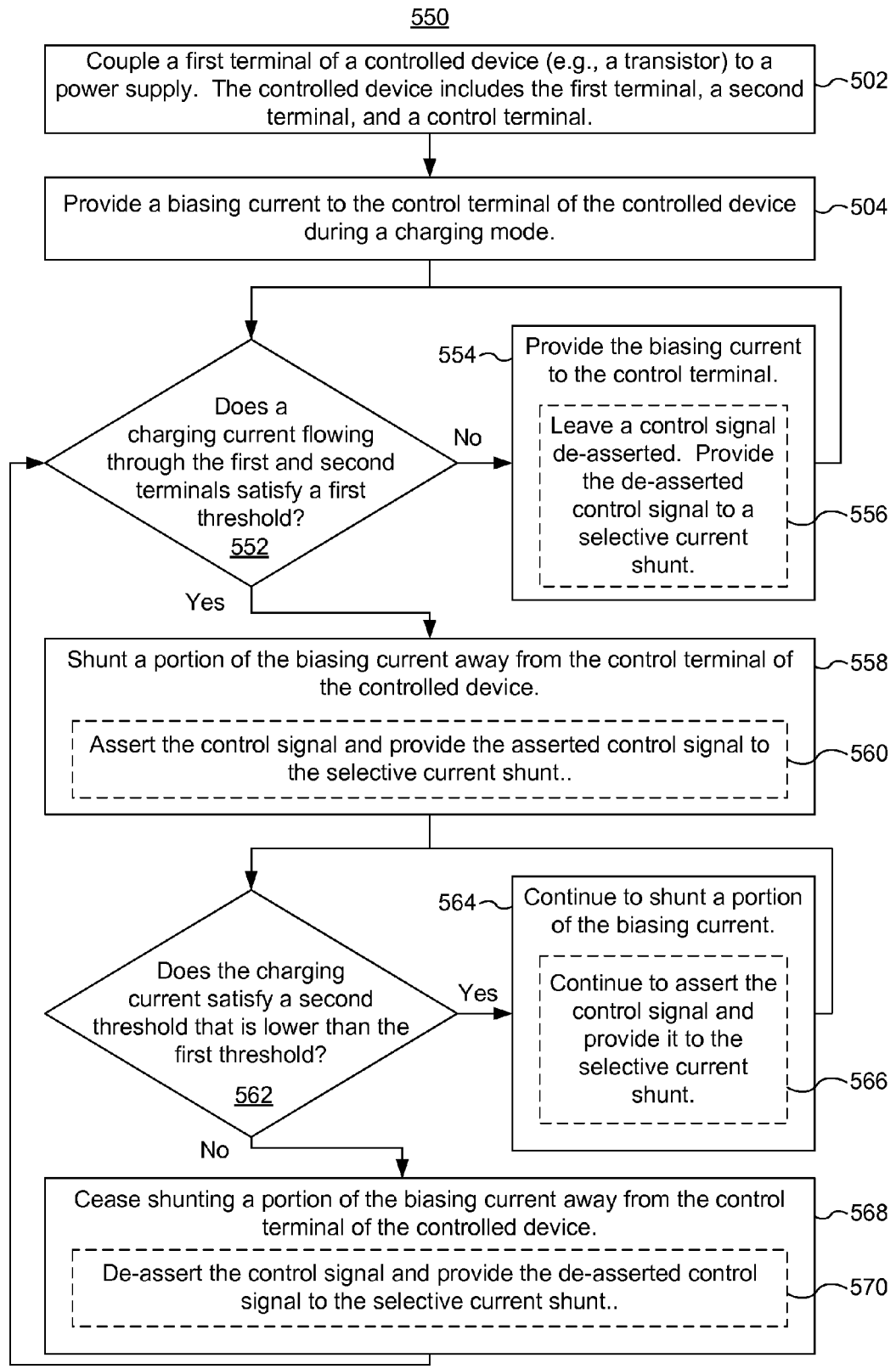

FIG. 5A illustrates a flowchart representation of a method 500 of mitigating anomalous charging current, in accordance with some embodiments. In some embodiments, the method 500 is performed by the power-control circuitry of FIGS. 2A, 2B, 3, and 4 during a charging mode.

A first terminal of a controlled device (e.g., transistor Q1, FIG. 2B) is coupled (502) to a power supply (e.g., through the 12V_IN power-supply node, FIG. 2A). The controlled device includes the first terminal, a second terminal, and a control terminal. For example, the transistor Q1 includes first and second source/drain terminals and a gate. In another example, the controlled device is a BJT that includes an emitter, collector, and base.

In some embodiments, the second terminal is coupled to an energy storage device 104 (e.g., a capacitor or bank of capacitors). For example, the second terminal of the transistor Q1 may be coupled to an energy storage device 104 through the inductor L1 (FIG. 2B) and the transistor Q5 (FIG. 4), which is configured as a diode. In this example, the inductor L1 couples the second terminal of the controlled device to a diode, and the diode provides a voltage (e.g., Vout, FIG. 1) from its output to the energy storage device 104.

A biasing current is provided (504) to the control terminal of the controlled device during a charging mode. In some embodiments, the biasing current is a substantially constant current. For example, the capacitor C1, transistor Q4 (as controlled by the SLOW RAMP signal from the control circuit 300), and gate driver in the hot-swap controller 204 together function as a constant-current source that provides a substantially constant current to the gate of the transistor Q1.

A determination is made (506) as to whether a charging current flowing through the first and second terminals of the controlled device satisfies (e.g., exceeds, or equals or exceeds) a threshold. The charging current is considered to be anomalous, and thus excessive, if it satisfies the threshold.

In some embodiments, to allow the determination 506 to be made, the charging current is monitored. Based on the monitoring, a current-monitoring signal (e.g., 12V_IMON) is generated (e.g., by the current-shunt monitor 202 or hot-swap controller 204, FIG. 2A) that indicates the value of the charging current. The current-monitoring signal is provided to a control circuit (e.g., control circuit 300, FIG. 3), which makes the determination 506.

In some embodiments, the threshold is programmable. For example, the threshold is specified in code in the current-control module 304 (FIG. 3).

If the charging current satisfies the threshold (506—Yes), a portion of the biasing current is shunted (508) away from the control terminal of the controlled device. In some embodiments, a control signal is asserted (510) and provided (512) to a selective current shunt. (The control signal is in a de-asserted state at the beginning of the method 500.) For example, control circuit 300 asserts CURRENT CONTROL, which is provided to the control terminal of the transistor Q3. The transistor Q3 turns on in response, creating a current path away from the control terminal of the transistor Q1, through the resistor R3 and the transistor Q3, to ground. A portion of the biasing current is shunted away from the control terminal of the transistor Q1 through this current path, and the biasing current actually provided to the control terminal of the transistor Q1 is reduced accordingly. Reducing the biasing current that is actually provided to the control terminal reduces the rate of increase (i.e., the slew rate) of 12V_RAW (FIG. 2B) and the 12V output voltage (FIG. 4), and thus reduces the charging current provided to an energy storage device 104 (FIG. 1). The method 500 then returns to operation 506 (e.g., assuming the charging mode has not ended), after an optional wait state 513 of a specified duration.

In some embodiments, the control signal (e.g., CURRENT CONTROL) is in a first logic state (e.g., logic-low) when de-asserted and in a second logic state (e.g., logic-high) when asserted. Alternatively, the magnitude of the control signal when asserted corresponds to (e.g., is proportional to) a difference between the value of the charging current and the threshold. The magnitude of the control signal is adjusted (e.g., periodically) in accordance with the difference between the value of the charging current and the threshold. The magnitude of the control signal thus may change as the charging current changes. Changing the magnitude of the control signal changes the amount of biasing current being shunted away from the control terminal of the controlled device. Setting the magnitude of the control signal to be proportional to the difference between the value of the charging current and the threshold may be referred to as a linear control scheme. In a linear control scheme, the amount of biasing current being shunted varies in proportion to the difference between the value of the charging current and the threshold.

If the charging current does not satisfy the threshold (506—No), the biasing current is provided (514) to the control terminal of the controlled device, and shunting is not performed. For example, the biasing current that reaches the control terminal of the controlled device in the operation 514 is the same substantially constant biasing current that reaches the control terminal of the controlled device in the operation 504. In some embodiments, the control signal (e.g., CURRENT CONTROL) is de-asserted (516) if it previously was asserted or remains de-asserted if it previously was de-asserted. The de-asserted control signal is provided to the selective current shunt (e.g., to the control terminal of the transistor Q3), which is off as a result. The method 500 then returns to operation 506 (e.g., assuming the charging mode has not ended), after an optional wait state 518 of a specified duration.

In some embodiments, the control circuit 300 makes the determination 506 periodically (e.g., with a 100 us period). Based on the result of each determination 506, the control circuit 300 either asserts or de-asserts the control signal (e.g., CURRENT CONTROL) for a duration that corresponds to the time period between successive determinations 506 (i.e., to the periodicity of the determinations 506). The control signal thus may be asserted or de-asserted for a fixed period of time in response to each determination 506, in accordance with the optional wait states 513 and 518. This approach, which results for example in the transistor Q3 being turned on or off for fixed periods of time, may be referred to as a constant-on-time (COT) control technique.

In the method 500, the threshold used to determine whether to perform current shunting is the same as (i.e., equals) the threshold used to determine whether to stop performing current shunting. An alternative is to use hysteretic control, in which a first threshold is used to determine whether to perform current shunting and second, lower threshold is used to determine whether to stop performing current shunting. Hysteretic control produces a control signal that shows hysteresis.

FIG. 5B illustrates a flowchart representation of a method 550 of using hysteretic control to mitigate anomalous charging current, in accordance with some embodiments. In some embodiments, the method 550 is performed by the power-control circuitry of FIGS. 2A, 2B, 3 and 4 during a charging mode.

A first terminal of a controlled device (e.g., transistor Q1, FIG. 2B) is coupled (502) to a power supply and a biasing current (e.g., a substantially constant biasing current) is provided (504) to the control terminal of the controlled device during a charging mode, as in the method 500 (FIG. 5A).

A determination is made (552) as to whether a charging current flowing through the first and second terminals of the controlled device satisfies (e.g., exceeds, or equals or exceeds) a first threshold. The charging current is considered to be anomalous, and thus excessive, if it satisfies the first threshold. In some embodiments, the control circuit 300 (FIG. 3) makes the determination 552 based on the value of current-monitoring signal 12V_IMON.

If the charging current does not satisfy the first threshold (552—No), the biasing current is provided (554) to the control terminal of the controlled device, and shunting is not performed. For example, the biasing current that reaches the control terminal of the controlled device in the operation 554 is the same substantially constant biasing current that reaches the control terminal of the controlled device in the operation 504. In some embodiments, a control signal (e.g., CURRENT CONTROL), which is in a de-asserted state at the beginning of the method 550 and also after the operation 570, and thus is always de-asserted when the determination 552 is being made, is left de-asserted (556) and provided to a selective current shunt (e.g., to the control terminal of the transistor Q3), which is off as a result.

If the charging current satisfies (e.g., exceeds, or equals or exceeds) the first threshold (552—Yes), a portion of the biasing current is shunted (558) away from the control terminal of the controlled device. In some embodiments, the control circuit 300 (FIG. 3) asserts (560) the control signal (e.g., CURRENT CONTROL) and provides it to the selective current shunt (e.g., to the control terminal of the transistor Q3), which turns on as a result.

While a portion of the biasing current is being shunted away from the control terminal of the controlled device, a determination is made (562) as to whether the charging current satisfies (e.g., exceeds, or equals or exceeds) a second threshold. The second threshold is lower than the first threshold. In some embodiments, the control circuit 300 (FIG. 3) makes the determination 562 based on the value of current-monitoring signal 12V_IMON.

If the charging current satisfies the second threshold (562—Yes) (e.g., if the charging current exceeds, or equals or exceeds, the second threshold), shunting of a portion of the biasing current away from the control terminal of the controlled device continues to be performed (564). For example, assertion of the control signal (e.g., CURRENT CONTROL) continues.

If the charging current does not satisfy the second threshold (562—No) (e.g., the charging current is less than, or less than or equal to, the second threshold), shunting of a portion of the biasing current away from the control terminal of the controlled device stops (568). In some embodiments, the control circuit 300 (FIG. 3) de-asserts (570) the control signal (e.g., CURRENT CONTROL) and provides it in its de-asserted state to the selective current shunt (e.g., to the control terminal of the transistor Q3), which turns off as a result. The method 550 may then return to the operation 552, such that shunting may be performed again if the charging current again becomes excessive.

In some embodiments, to allow the determinations 552 and 562 to be made, the charging current is monitored. Based on the monitoring, a current-monitoring signal (e.g., 12V_IMON) that indicates the value of the charging current is generated. The current-monitoring signal is provided to a control circuit (e.g., control circuit 300, FIG. 3), which makes the determinations 552 and 562.

In some embodiments, COT control is used, such that respective determinations 552 and 562 are performed periodically (e.g., with either a determination 552 or a determination 562 being made once per period). Based on the result of each determination 552 and 562, the control signal is either asserted or de-asserted for a duration that corresponds to the time period between successive determinations 506 (i.e., to the periodicity of the determinations 506), in accordance with optional wait states (not shown) between operations 570 and 552, between operations 556 and 552, and between operations 566 and 562. The transistor Q3, for example, thus may be turned on or off for fixed periods of time.

In some embodiments, the first and second thresholds are programmable. For example, the first and second thresholds are specified in code in the current-control module 304 (FIG. 3).

The methods 500 and 550 allow excessive, anomalous charging current to be detected and reduced, thus avoiding such problems as violation of a system's charging-current specification, tripping of upstream circuit protection, overloading and shutdown of upstream power supplies, and drooping of supply voltage. The methods 500 and 550 achieve this benefit while being compatible with constant-voltage-slew-rate charging, in accordance with some embodiments. Also, because the current shunting of the methods 500 and 550 is selective, the methods 500 and 550 do not slow down charging when the charging current is not excessive or anomalous.

As discussed with respect to FIG. 3, the non-volatile memory 302 (and/or a non-transitory computer-readable storage medium external to the control circuit 300) may store instructions that, when executed by the control circuit 300, cause power-control circuitry to perform the method 500 or 550. For example, the current-control module 304 may include the following sub-modules:

instructions to provide a voltage-ramp signal (e.g., SLOW RAMP) to a current source to configure the current source to provide a biasing current (e.g., a substantially constant biasing current) to a control terminal of a controlled device (e.g., transistor Q1) during a charging mode;

instructions to determine whether a charging current flowing through the controlled device during the charging mode satisfies a threshold (e.g., in accordance with determinations 506, 552, and/or 562, FIGS. 5A-5B);

instructions to assert a control signal (e.g., CURRENT CONTROL) provided to a selective current shunt in response to a determination that the charging current satisfies a threshold (e.g., in accordance with operation 510 or 560, FIGS. 5A-5B); and/or instructions to de-assert the control signal in response to a determination that the charging current does not satisfy a threshold (e.g., in accordance with operations 516, 556, and/or 570, FIGS. 5A-5B).

It will be understood that, although the terms "first," "second," etc. may be used herein to describe various elements, these elements should not be limited by these terms. These terms are only used to distinguish one element from another. For example, a first transistor could be termed a second transistor, and, similarly, a second transistor could be termed a first transistor, without changing the meaning of the description, so long as all occurrences of the "first transistor" are renamed consistently and all occurrences of the "second transistor" are renamed consistently. The first transistor and the second transistor are both transistors, but they are not the same transistor.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A power-control circuit, comprising:
    a controlled device comprising a first terminal coupled to a power-supply node, a second terminal to provide a first output voltage, and a control terminal;
    a current source, distinct from the controlled device, to provide a biasing current to the control terminal of the controlled device during a charging mode, the biasing current to bias a charging current between the first and second terminals of the controlled device;
    a control circuit configured to determine whether the charging current between the first and second terminals of the controlled device satisfies a first threshold; and
    a selective current shunt configured to shunt a portion of the biasing current away from the control terminal of the controlled device in response to the determination that the charging current through the first and second terminals of the controlled device satisfies the first threshold during the charging mode.

2. The power-control circuit of claim 1, wherein:
    the control circuit is configured to assert a control signal in response to the determination that the charging current satisfies the first threshold;
    the selective current shunt is configured to shunt a portion of the biasing current away from the control terminal of the controlled device in response to assertion of the control signal; and
    shunting a portion of the biasing current away from the control terminal reduces the charging current.

3. The power-control circuit of claim 2, wherein the selective current shunt comprises:
    one or more resistors; and
    a transistor situated in series with the one or more resistors between the control terminal of the controlled device and ground, the transistor comprising a control terminal to receive the control signal;
    wherein the transistor is configured to couple the control terminal of the controlled device to ground through the one or more resistors in response to assertion of the control signal.

4. The power-control circuit of claim 2, wherein the control circuit is to de-assert the asserted control signal in response to a determination during the charging mode that the charging current does not satisfy the first threshold.

5. The power-control circuit of claim 4, wherein:
    the control circuit comprises a microcontroller; and
    the first threshold is programmable.

6. The power-control circuit of claim 2, wherein the control circuit is to de-assert the asserted control signal in response to a determination during the charging mode that the charging current does not satisfy a second threshold that is lower than the first threshold.

7. The power-control circuit of claim 6, wherein:
    the control circuit comprises a microcontroller; and
    the first and second thresholds are programmable.

8. The power-control circuit of claim 2, further comprising current-sensing circuitry configured to monitor the charging current and provide a current-monitoring signal that indicates a value of the charging current to the control circuit.

9. The power-control circuit of claim 1, further comprising a diode, the diode comprising:
    an input coupled to the second terminal of the controlled device; and
    an output to provide a second output voltage to an energy-storage device.

10. The power-control circuit of claim 9, wherein the energy-storage device comprises a capacitor bank.

11. The power-control circuit of claim 10, wherein the capacitor bank is a capacitor bank of a solid-state drive.

12. The power-control circuit of claim 1, wherein:
the current source comprises a constant-current source; and
the biasing current is a substantially constant current.

13. The power-control circuit of claim 12, wherein the constant-current source comprises:
a driver, coupled to the control terminal of the controlled device, to provide a bias voltage;
a capacitor coupled to the control terminal of the controlled device; and
a transistor, coupled between the capacitor and ground, to selectively couple the capacitor to ground in accordance with a voltage-ramp signal.

14. A method of mitigating anomalous charging current, comprising:
coupling a first terminal of a controlled device to a power supply, the controlled device comprising the first terminal, a second terminal, and a control terminal;
biasing a charging current between the first and second terminals of the controlled device by providing a biasing current to the control terminal of the controlled device during a charging mode;
determining whether a charging current flowing through the first and second terminals of the controlled device during the charging mode satisfies a first threshold; and
shunting a portion of the biasing current away from the control terminal of the controlled device in response to a determination that the charging current satisfies the first threshold.

15. The method of claim 14, wherein shunting a portion of the biasing current away from the control terminal of the controlled device reduces the charging current, and the shunting comprises:
asserting a control signal in response to the determination that the charging current satisfies the first threshold; and
providing the asserted control signal to a selective current shunt that couples the control terminal of the controlled device to ground when the control signal is asserted.

16. The method of claim 15, further comprising:
periodically making determinations as to whether the charging current satisfies a threshold;
in response to a respective determination that the charging current satisfies a threshold, asserting the control signal for a duration corresponding to a time period between successive determinations; and
in response to a respective determination that the charging current does not satisfy a threshold, de-asserting the control signal for the duration corresponding to the time period between successive determinations.

17. The method of claim 15, further comprising:
determining that the charging current does not satisfy the first threshold;
de-asserting the control signal in response to determining that the charging current does not satisfy the first threshold; and
providing the de-asserted control signal to the selective current shunt;
wherein the selective current shunt decouples the control terminal of the controlled device from ground when the control signal is de-asserted.

18. The method of claim 15, further comprising:
with the control signal asserted, determining that the charging current does not satisfy a second threshold that is lower than the first threshold
de-asserting the control signal in response to determining that the charging current does not satisfy the second threshold; and
providing the de-asserted control signal to the selective current shunt;
wherein the selective current shunt decouples the control terminal of the controlled device from ground when the control signal is de-asserted.

19. The method of claim 15, further comprising:
monitoring the charging current;
based on the monitoring, generating a current-monitoring signal that indicates a value of the charging current; and
providing the current-monitoring signal to a control circuit that asserts the control signal in response to the determination that the charging current satisfies the first threshold.

20. The method of claim 19, further comprising setting a magnitude of the asserted control signal in accordance with a difference between the value of the charging current and the first threshold, wherein the magnitude of the asserted control signal is proportional to the difference between the value of the charging current and the first threshold.

21. The method of claim 14, further comprising:
coupling the second terminal of the controlled device to an input of a diode; and
providing a voltage from an output of the diode to a capacitor bank.

22. A non-transitory computer-readable storage medium storing one or more programs configured for execution by a processor in a power-control circuit, the one or more programs comprising:
instructions to provide a voltage-ramp signal to a current source to configure the current source to provide a biasing current to a control terminal of a controlled device during a charging mode, the biasing current to bias a charging current between first and second terminals of the controlled device;
instructions to determine whether the charging current flowing through the controlled device during the charging mode satisfies a first threshold; and
instructions to assert a control signal provided to a selective current shunt in response to a determination that the charging current satisfies the first threshold, wherein the selective current shunt shunts a portion of the biasing current away from the control terminal of the controlled device when the control signal is asserted.

23. The computer-readable storage medium of claim 22, wherein the one or more programs further comprise instructions to de-assert the control signal in response to a determination that the charging current does not satisfy the first threshold, wherein the selective current shunt ceases to shunt the portion of the biasing current away from the control terminal of the controlled device when the control signal is de-asserted.

* * * * *